(12) United States Patent
Utsunomiya et al.

(10) Patent No.: US 10,724,421 B2
(45) Date of Patent: Jul. 28, 2020

(54) EXHAUST SYSTEM OF INTERNAL COMBUSTION ENGINE

(71) Applicants: Toyota Jidosha Kabushiki Kaisha, Toyota-shi, Aichi-ken (JP); Futaba Industrial Co. Ltd., Okazaki-shi, Aichi-ken (JP)

(72) Inventors: Keiji Utsunomiya, Toyota (JP); Nakaya Takagaki, Toyota (JP); Masaya Takeuchi, Okazaki (JP)

(73) Assignees: Toyota Jidosha Kabushiki Kaisha, Toyota-shi, Aichi-ken (JP); Futaba Industrial Co. Ltd, Okazaki (JP)

( * ) Notice: Subject to any disclaimer, the term of this patent is extended or adjusted under 35 U.S.C. 154(b) by 60 days.

(21) Appl. No.: 16/154,410

(22) Filed: Oct. 8, 2018

(65) Prior Publication Data
US 2019/0107032 A1  Apr. 11, 2019

(30) Foreign Application Priority Data
Oct. 10, 2017 (JP) .................... 2017-196570

(51) Int. Cl.
*F01N 13/18* (2010.01)
*B60K 13/04* (2006.01)
(Continued)

(52) U.S. Cl.
CPC .......... *F01N 13/1811* (2013.01); *B60K 13/04* (2013.01); *F01N 3/005* (2013.01);
(Continued)

(58) Field of Classification Search
CPC .. F01N 13/1838; F01N 13/1877; F01N 13/20; F01N 3/005; F01N 2240/20; F01N 2240/22; F01N 2340/04; B60K 13/04
(Continued)

(56) References Cited

U.S. PATENT DOCUMENTS 2,921,432 A * 1/1960 Marcotte ................. F01N 13/00
 55/307
9,211,785 B2 * 12/2015 Tohara ...................... B60K 1/04
(Continued)

FOREIGN PATENT DOCUMENTS

JP   2004257261 A  *  9/2004
JP   2006169984 A  *  6/2006
(Continued)

*Primary Examiner* — Jeremy A Luks
(74) *Attorney, Agent, or Firm* — Dinsmore & Shohl LLP (57) ABSTRACT

In an exhaust system of an internal combustion engine, an exhaust pipe is reliably bent and deformed during vehicle rear collision while improving drainage performance in the exhaust pipe in normal times. The exhaust system 1 includes a second pipe 17 corresponding to a downstream end part of an exhaust pipe 10 through which exhaust gas flows from an engine 2. The second pipe 17 includes: a fragile part 30 as a starting point of bending deformation of a tail pipe 13; and a partition plate 20 vertically dividing the inside of the second pipe 17 to form, under the partition plate 20, a lower passage 7 to flow water that accumulates in the exhaust pipe 10. The partition plate 20 is in a vicinity of the fragile part 30 and at a position not overlapping with the fragile part 30 in an axial direction of the second pipe 17.

6 Claims, 7 Drawing Sheets

(51) Int. Cl.
  *F01N 13/20* (2010.01)
  *F01N 13/08* (2010.01)
  *F01N 3/00* (2006.01)

(52) U.S. Cl.
  CPC ....... *F01N 13/082* (2013.01); *F01N 13/1838* (2013.01); *F01N 13/1877* (2013.01); *F01N 13/20* (2013.01); *F01N 2240/20* (2013.01); *F01N 2240/22* (2013.01); *F01N 2340/04* (2013.01)

(58) Field of Classification Search
  USPC .................................................. 181/228, 244
  See application file for complete search history.

(56) References Cited

U.S. PATENT DOCUMENTS

| | | |
|---|---|---|
| 2004/0063364 A1 | 4/2004 | Matsuda |
| 2009/0288912 A1* | 11/2009 | Yamaguchi ............ B60K 13/04 181/227 |
| 2018/0179943 A1 | 6/2018 | Oya et al. |

FOREIGN PATENT DOCUMENTS

| | | | |
|---|---|---|---|
| JP | 2010-215005 A | | 9/2010 |
| JP | 2015-158149 A | | 9/2015 |
| JP | 2017101613 A | * | 6/2017 |
| JP | 2018-105206 A | | 7/2018 |

* cited by examiner

EXHAUST SYSTEM OF INTERNAL COMBUSTION ENGINE

CROSS-REFERENCE TO RELATED APPLICATION

This application claims priority to Japanese Patent Application No. 2017-196570 filed on Oct. 10, 2017, the entire contents of which are herein incorporated by reference.

TECHNICAL FIELD

The present disclosure relates to an exhaust system of an internal combustion engine.

BACKGROUND

In vehicles such as automobiles, an exhaust pipe, through which exhaust gas from an engine flows, is generally disposed in a lower part of a vehicle body so as to extend to a vehicle rear part. Regarding such an exhaust pipe, many structures have been proposed.

For example, under the condition that various attempts have been executed, conventionally, to absorb a shock at the time of a rear collision using a crush space of a vehicle rear part, JP 2010-215005 A discloses ensuring a shock absorbing stroke using an exhaust pipe having a fragile part formed by a heading part or a bellows part so that the exhaust pipe is easily bent at the time of a rear collision, thus preventing the exhaust pipe from obstructing deformation of the vehicle rear part.

Also, when the pressure of the exhaust gas is, for example, reduced, water may accumulate in the exhaust pipe. JP 2015-158149 A discloses forming an exhaust passage and a drainage passage by disposing a partition plate inside a pipe body downstream of a center pipe (exhaust pipe), thus improving drainage performance.

SUMMARY

Meanwhile, from the viewpoint of ensuring shock absorbing stroke at the time of a rear collision, it is preferable that the fragile part as disclosed in JP 2010-215005 A is provided in a downstream end part of the exhaust pipe. Also, from the viewpoint of smoothly discharging exhaust gas and water from the downstream end of the exhaust pipe, it is preferable that the partition plate as disclosed in JP 2015-158149 A is also disposed in the downstream end part of the exhaust pipe.

However, when the partition plate is disposed inside the exhaust pipe, the section modulus of the exhaust pipe in a region where the partition plate is disposed increases. Thus, in the above region, the exhaust pipe is hardly bent and deformed. Accordingly, when both the fragile part and the partition plate are disposed in the downstream end part of the exhaust pipe, the partition plate may prevent the exhaust pipe from being bent and deformed with the fragile part as a starting point, depending on the positional relationship between the fragile part and the partition plate.

As a result, it is difficult to achieve both important properties of the exhaust pipe, i.e. rear collision adaptability and drainage performance.

The present disclosure was made in consideration of the above problem, an object of which is to provide a technique for reliably bending and deforming an exhaust pipe in an exhaust system of an internal combustion engine at the time of a vehicle rear collision while Improving drainage performance in the exhaust pipe in normal times.

In order to achieve the above object, in the exhaust system or an internal combustion engine of the present disclosure, the position of the partition plate inside the exhaust pipe is adjusted so as to not prevent bending deformation of the exhaust pipe.

Specifically, the present disclosure provides an exhaust system of an internal combustion engine that includes an exhaust pipe through which exhaust gas flows from the internal combustion engine, in which the exhaust pipe includes, in a downstream end part thereof: a fragile part to serve as a starting point of bending deformation of the exhaust pipe; and a partition plate that divides an inside of the exhaust pipe into an upper portion and a lower portion so as to form, under the partition plate, a passage to flow water that accumulates in the exhaust pipe.

The partition plate is disposed in a vicinity of the fragile part and furthermore at a position not overlapping with the fragile part in an axial direction of the exhaust pipe.

In this configuration, the partition plate is disposed in the downstream end part of the exhaust pipe so that the inside of the exhaust pipe is divided into the upper portion and the lower portion. Thus, a passage is formed so as to flow water that accumulates in the exhaust pipe, which improves the drainage performance inside the exhaust pipe in normal times.

In this way, the partition plate that functions to increase the section modulus of the exhaust pipe and the fragile part that serves as the starting point of the bending deformation of the exhaust pipe are disposed so as to not overlap with each other in the axial direction of the exhaust pipe. Thus, it is possible to prevent the partition plate from blocking the bending deformation of the exhaust pipe. Furthermore, the partition plate that functions to increase the section modulus of the exhaust pipe is disposed in the vicinity of the fragile part, which is likely to cause the stress concentration to the fragile part. Accordingly, the exhaust pipe can be reliably bent and deformed at the time of a vehicle rear collision. Thus, at the time of the rear collision, the exhaust pipe can be displaced downward, which serves to not only ensure shock absorbing stroke, but also to evacuate a main muffler and the like in a lower region of the vehicle.

Also, in the above-described exhaust system, it is preferable that the fragile part is constituted by a recess part that is disposed downstream of the partition plate and that is formed by making a dent in an upper face of the exhaust pipe. Furthermore, it is preferable that the partition plate includes: an upstream side part that gradually inclines downward toward the downstream; and a downstream side part that gradually inclines upward toward the downstream, so that a cross-sectional area of the passage in a center part is smaller than the cross-sectional area in an upstream side and the cross-sectional area in the downstream side, and it is preferable that the recess part and the downstream side part are formed so that a lower end of the recess part does not protrude downward beyond a virtual extension surface of the downstream side part.

In this configuration, the fragile part is constituted by the recess part that is formed by making a dent in the upper face of the exhaust pipe. Thus, the exhaust pipe can be bent and deformed with the fragile part as the starting point, by synergistic effects of: reduction in the moment of inertia of area and the section modulus of the exhaust pipe associated with decrease in the cross-sectional area due to the recess part; and stress concentration to the recess part.

The partition plate includes: the upstream side part that gradually inclines downward toward the downstream; and the downstream side part that gradually inclines upward toward the downstream, so that the cross-sectional area of the passage under the partition plate is smaller, in the center part, than the cross-sectional area in the upstream side and the cross-sectional area in the downstream side. Thus, the flow rate of the exhaust gas is increased in the passage, which promotes the exhaust function and the drainage function at the downstream end part of the exhaust pipe.

However, if the lower end of the recess part protrudes downward beyond the virtual extension surface the downstream side part, draining water and exhaust gas that flow along the downstream side part gradually inclining upward toward the downstream make contact with the recess part. Thus, the drainage function is prevented and the flow of the exhaust gas is disturbed, which may lead to increase in the back pressure.

In this respect, in the present disclosure, the recess part and the downstream side part are formed so that the lower end of the recess part does not protrude downward beyond the virtual extension surface of the downstream side part. Thus, it is possible to prevent the draining water and the exhaust gas that flow along the downstream side part from making contact with the recess part. In this way, the draining water and the exhaust gas can smoothly flow, which prevents degradation of the drainage function and also reduces increase in the back pressure.

Also, in the above-described exhaust system, it is preferable that the recess part and the downstream side part are formed so that the lower end of the recess part is substantially flush with the virtual extension surface of the downstream side part.

In this configuration, the draining water and the exhaust gas, which have flown to the recess part along the downstream side part gradually inclining upward toward the downstream, can further flow along the lower end of the recess part that is set to be substantially flush with the virtual extension surface of the downstream side part. In other words, the lower end of the recess part can be used as a guide part, thereby further improving the drainage performance and the exhaust performance.

Also, in the above-described exhaust system, it is preferable that the fragile part and the partition plate are disposed in the exhaust pipe, at a portion that is constituted by half pipes made by dividing a pipe into an upper part and a lower part in a vertical direction.

In this configuration, for example, after attaching the partition plate, by welding or the like, to the upper half pipe having the recess part, the upper half pipe and the lower half pipe are vertically bonded to each other. In this way, it is possible to manufacture the exhaust pipe having the fragile part and the partition plate easily and accurately.

As described above, with an exhaust system of an internal combustion engine of the present disclosure, an exhaust pipe is reliably bent and deformed at the time of a vehicle rear collision and the like while drainage performance in the exhaust pipe is improved in normal times.

DETAILED DESCRIPTION

Hereinafter, an embodiment to carry out the present disclosure will be described with reference to the drawings. Note that an arrow "UP" in FIGS. 1 to 7 indicates an upside in the up-and-down direction, an arrow "FR" is FIGS. 1, 2 and 4-7 indicates a front side in the front-back direction of a vehicle, and an arrow "RH" in FIGS. 3A-3D indicates a right side in a vehicle width direction. Also, for the sake of visibility, the hatching showing the cross section is omitted in FIGS. 2-4, 6 and 7.

Overall Configuration

Figure 1:
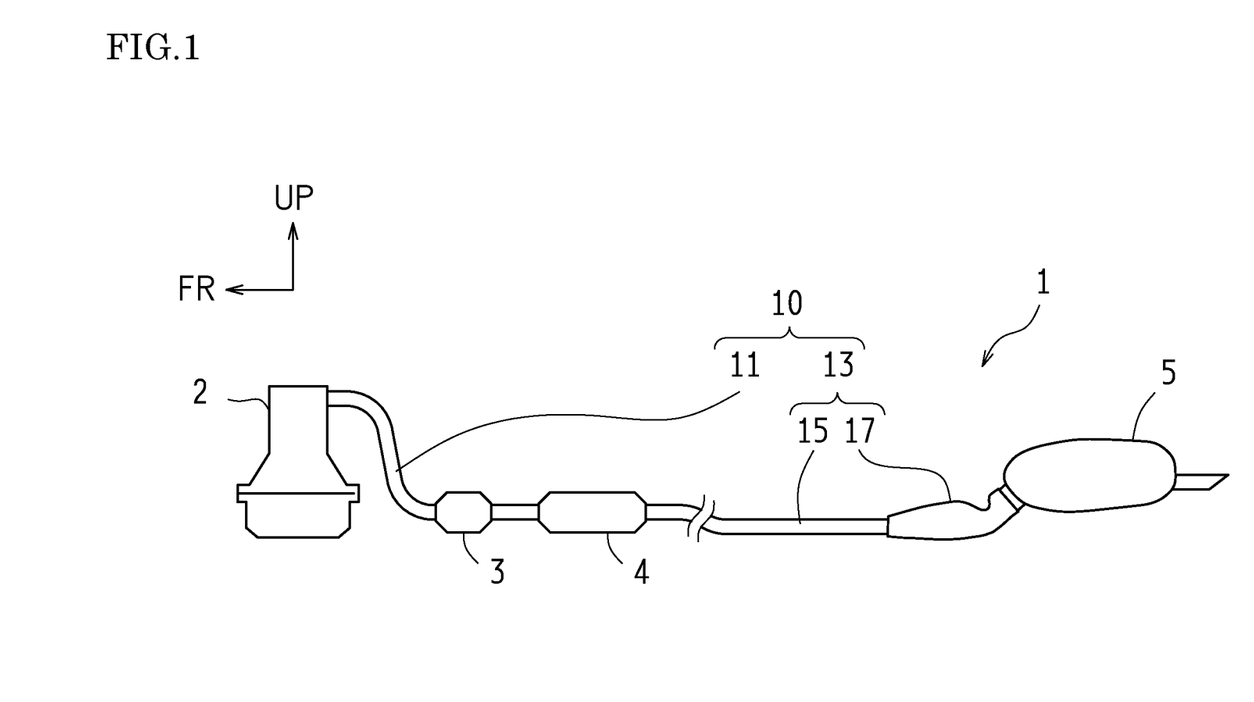
FIG. 1 is a diagram schematically showing an exhaust system of an internal combustion engine according to an embodiment of the present disclosure.

FIG. 1 is a diagram schematically showing an exhaust system 1 of an internal combustion engine according to this embodiment. The exhaust system 1 extends in the front-back direction of a vehicle, and includes: an exhaust pipe 10 through which exhaust gas flows from an engine (internal combustion engine) 2; a catalytic converter 3 that purities the exhaust gas; a sub muffler 4 that reduces exhaust sound; and a main muffler 5. The exhaust pipe 10 includes: a front pipe 11 disposed on a front side (upstream) in the front-back direction of the vehicle; a center pipe disposed at a center in the front-back direction of the vehicle (not shown); and a tail pipe 13 disposed on a back side (downstream) in the front-back direction of the vehicle. An upstream end of the front pipe 11 is connected to an exhaust manifold (not shown) provided in the engine 2. The catalytic converter 3 and the sub muffler 4 are interposed in the front pipe 11. The tail pipe 13 is constituted by an upstream first pipe 15 and a downstream second pipe 17. A downstream end of the second pipe 17 is connected to the main muffler 5.

Note that the second pipe 17 corresponds to a "downstream end part of an exhaust pipe" in the claims.

Partition Plate

Figure 2:
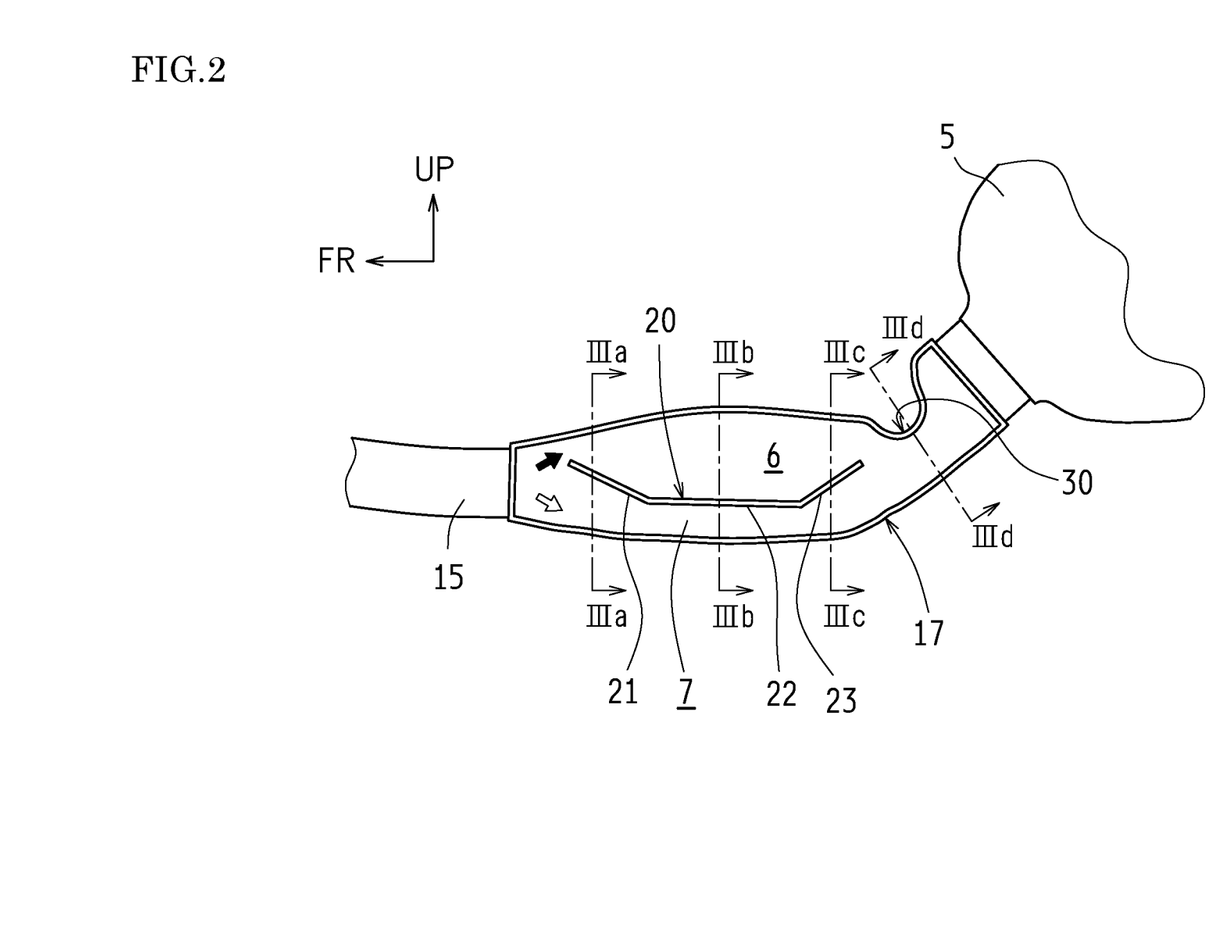
FIG. 2 is a longitudinal sectional view schematically showing a downstream end part of an exhaust pipe.
Figure 3A:
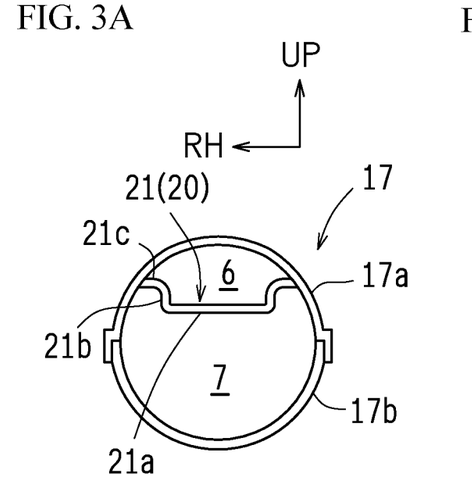
FIG. 3A is a cross-sectional view viewed from arrow IIIa-IIIa in FIG. 2.
Figure 3B:
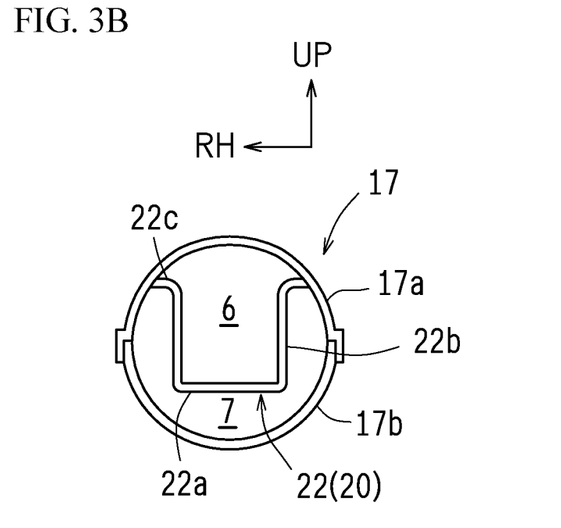
FIG. 3B is a cross-sectional view viewed from arrow IIIb-IIIb in FIG. 2.
Figure 3C:
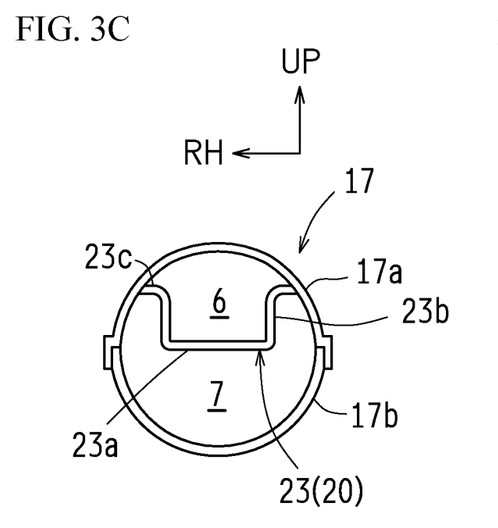
FIG. 3C is a cross-sectional view viewed from arrow IIIc-IIIc in FIG. 2.
Figure 3D:
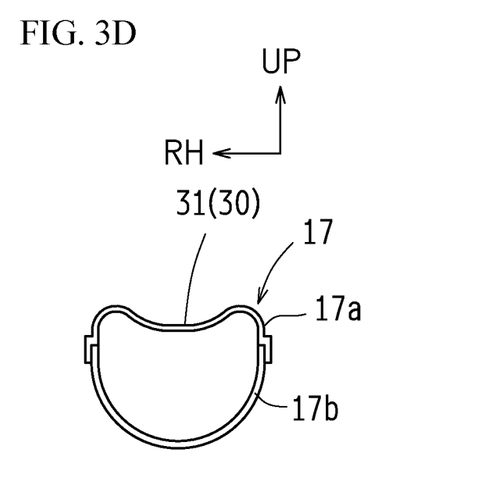
FIG. 3D is a cross-sectional view viewed from arrow IIId-IIId in FIG. 2.

FIG. 2 is a longitudinal sectional view schematically showing a downstream end part of the exhaust pipe 10. FIGS. 3A through 3D are diagrams schematically showing, respectively, the downstream end parts of the exhaust pipe 10. FIG. 3A is a cross-sectional view viewed from arrow IIIa-IIIa in FIG. 2. FIG. 3B is a cross-sectional view viewed from arrow IIIb-IIIb in FIG. 2. FIG. 3C is a cross-sectional view viewed from arrow IIIc-IIIc in FIG. 2. FIG. 3D is a cross-sectional view viewed from arrow IIId-IIId in FIG. 2. In FIG. 2, only the second pipe 17 and a partition plate 20 are shown as cross-sections. The second pipe 17, which corresponds to the downstream end part of the exhaust pipe 10, is formed by an upper half pipe 17a and a lower half pipe 17b, which respectively have shapes made by dividing a pipe into upper and power two parts in the vertical direction, as shown in FIGS. 3A through 3D. Thus, the second pipe 17 is made by slightly overlapping the upper half pipe 17a with the lower half pipe 17b so as to bond the overlapped parts by welding. Accordingly, the second pipe 17 is what is called a "hollow structure" by welding the overlapped parts.

The partition plate 20 is disposed in the second pipe 17 so as to divide the inside of the second pipe 17 into an upper portion and a lower portion, which forms an upper passage 6 to flow the exhaust gas through the upper side of the partition plate 20 and a lower passage 7 to flow the exhaust gas and accumulated water in the exhaust pipe 10 through the lower side of the partition plate 20.

As shown in FIGS. 3A to 3C, the partition plate 20 is constituted by: bottom plate parts 21a, 22a and 23a; vertical plate parts 21b, 22b and 23b extending upward, respectively from both ends of the bottom plate parts 21a, 22a and 23a in the vehicle width direction; and flange parts 21c, 22c and 23c extending outside, respectively from top ends of the vertical plate parts 21b, 22b and 23b in the vehicle width direction. Thus, the partition plate 20 is formed so as to have a substantially hat-like cross-section in the axial direction of the second pipe 17. The flange parts 21c, 22c and 23c of the partition plate 20 are attached to the inner surface of the upper half pipe 17a, and then the upper half pipe 17a is bonded to the lower half pipe 17b. Thus, the partition plate 20 divides the inside of the second pipe 17 into the upper portion and the lower portion.

In this partition plate 20, as shown in FIGS. 3A to 3C, the flow passage area of the lower passage 7 changes as the respective lengths of the vertical plate parts 21b, 22b and 23b change. Specifically, the partition plate 20 is constituted by: an upstream side part 21 in which the bottom plate part 21a gradually in inclines downward toward the downstream due to the vertical plate part 21b that gradually extends downward toward the downstream; a center part 22 in which the vertical plate part 22b and the bottom plate part 22a extend from the back end of the upstream side part 21 toward the downstream without changing the length of the vertical plate part 22b and the inclination of the bottom plate part 22a; and a downstream side part 23 in which the bottom plate part 23a gradually inclines upward toward the downstream due to the vertical plate part 23b that gradually shortens upward toward the downstream, from the back end of the center part 22. Thus, the cross-sectional area of the lower passage 7 in the center part is smaller than the cross-sectional area in the upstream side and that in the downstream side.

In this way, the cross-sectional area of the lower passage 7 is reduced in the center part 22. Accordingly, the exhaust gas flows from the upstream side part 21 info the center part 22 where the flow rate of the exhaust gas is increased, and then is discharged through the downstream side part 23 to the main muffler 5. Such increase in the flow rate of the exhaust gas also promotes drainage of the water that accumulates in the exhaust pipe 10 to the main muffler 5. That is, in the exhaust system 1 of the internal combustion engine according to this embodiment, the partition plate 20 is disposed in the second pipe 17 so as to form the lower passage 7 having a narrowed part, which promotes the exhaust function and the drainage function at the downstream end part of the exhaust pipe 10.

As shown in FIG. 2, the inlet of the lower passage 7 is set to large while the inlet of the upper passage 6 is set to small due to the upstream side part 21 of the partition plate 20.

Thus, in normal times, the lower passage 7 functions as a main passage through which most of the exhaust gas passes as indicated by the outlined arrow in FIG. 2 while the upper passage 6 functions as a sub passage. On the other hand, when the lower passage 7 is clogged with frozen water that has accumulated in the exhaust pipe 10 in cold climates or the like, the upper passage 6 functions as a main passage through which most of the exhaust gas passes as indicated by the black arrow in FIG. 2.

Fragile Part

Also as shown in FIG. 2, the second pipe 17 is provided with a fragile part 30 that serves as a starting point of bending deformation of the tail pipe 13. More specifically, the fragile part 30 is constituted by a recess part 31 that is disposed downstream of the partition plate 20 and that is formed by making a dent in the upper face of the second pipe 17, as shown in FIG. 3D.

Like this, by forming the fragile part 30 constituted by the recess part 31 in the second pipe 17, the second pipe 17 (the tail pipe 13 including the second pipe 17) can be bent and deformed with the fragile part 30 as the starting point at the time of a rear collision, by synergistic effects of: reduction in the moment of inertia of area and the section modulus of the second pipe 17 associated with decrease in the cross-sectional area due to the recess part 31; and stress concentration to the recess part 31. Thus, it is possible to ensure shock absorbing stroke at the time of a rear collision.

Relationship Between Partition Plate and Fragile Part

Meanwhile, when the partition plate 20 is disposed inside the second pipe 17, the section modulus of the second pipe 17 increases and the second pipe 17 is hardly bent and deformed. Accordingly, when the second pipe 17 is provided with both the fragile part 30 for easily bending the second pipe 17 and the partition plate 20 for preventing the second pipe 17 from bending, the partition plate 20 may prevent the second pipe 17 from being bent an deformed with the fragile part 30 as the starting point at the time of a rear collision, depending on the positional relationship between the fragile part 30 and the partition plate 20, more specifically, in the state in which the fragile part 30 and the partition plate 20 are overlapped with each other.

Figure 7:
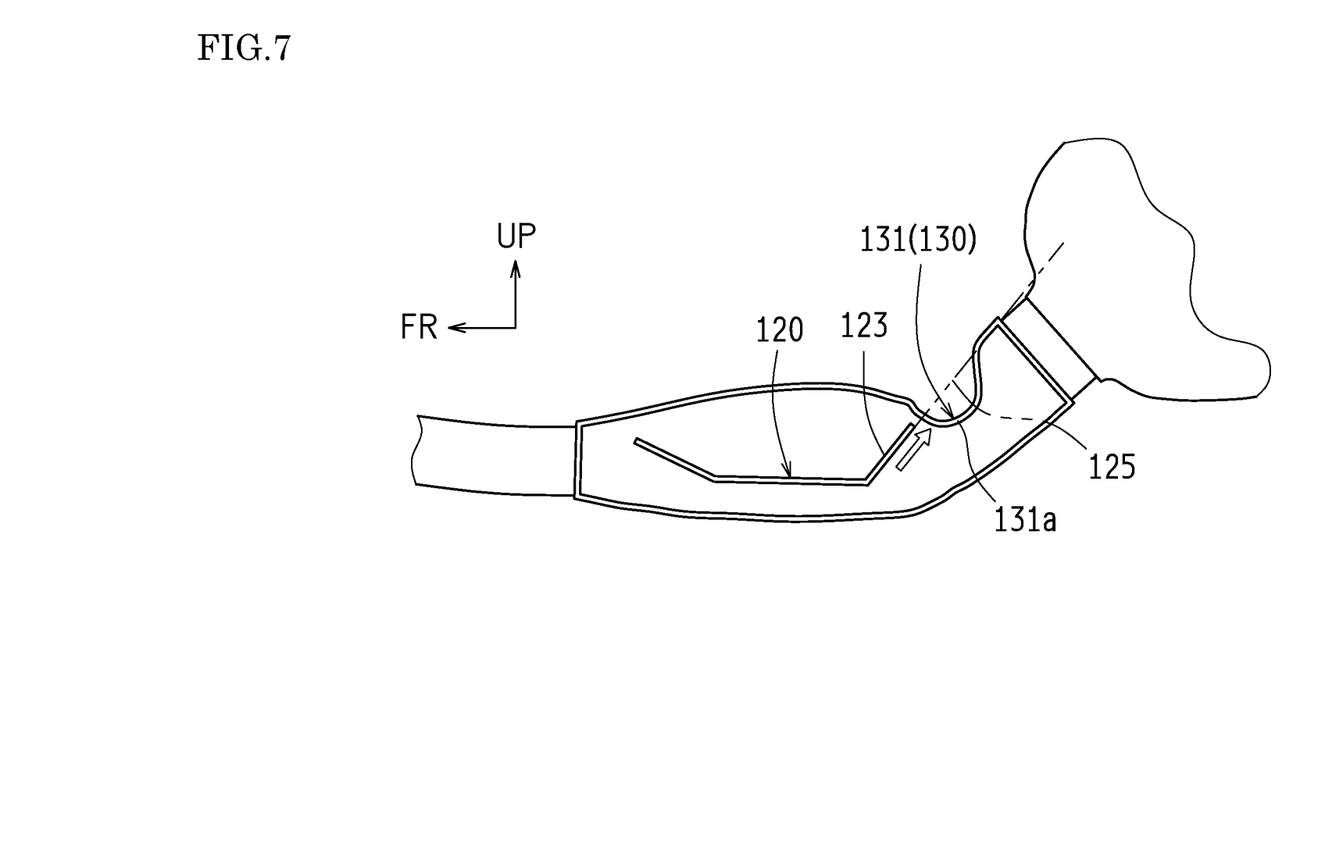
FIG. 7 is a schematic diagram indicating a relationship between the partition plate and the fragile part in a comparative example.

Also, even when the partition plate 20 does not prevent the bending deformation caused by the fragile part 30, if a lower end 131a of a recess part 131 constituting a fragile part 130 protrudes, as shown in FIG. 7, downward beyond a virtual extension surface 125 of a downstream side part 123 of a partition plate 120, draining water and exhaust gas that flow along the downstream side part 123 gradually inclining upward toward the downstream make contact with the recess part 131 as indicated by the outlined arrow FIG. 7. Thus, the drainage function is prevented and the flow of the exhaust gas is disturbed, which may lead to increase in the back pressure.

In the exhaust system 1 of the internal combustion engine according to this embodiment, the position of the partition plate 20 inside the second pipe 17 is adjusted so as to not prevent the bending deformation of the second pipe 17 and further to not prevent the drainage function and the exhaust function. Specifically, in the exhaust system 1 of the internal combustion engine according to this embodiment, the partition plate 20 is disposed in the vicinity of the recess part 31 constituting the fragile part 30 and furthermore at a position not overlapping with the recess part 31 in the axial direction of the second pipe 17. Furthermore, the recess part 31 and the downstream side part 23 are formed so that a lower end 31a of the recess part 31 is substantially flush with a virtual extension surface 25 of the downstream side part 23 of the partition plate 20.

Figure 4:
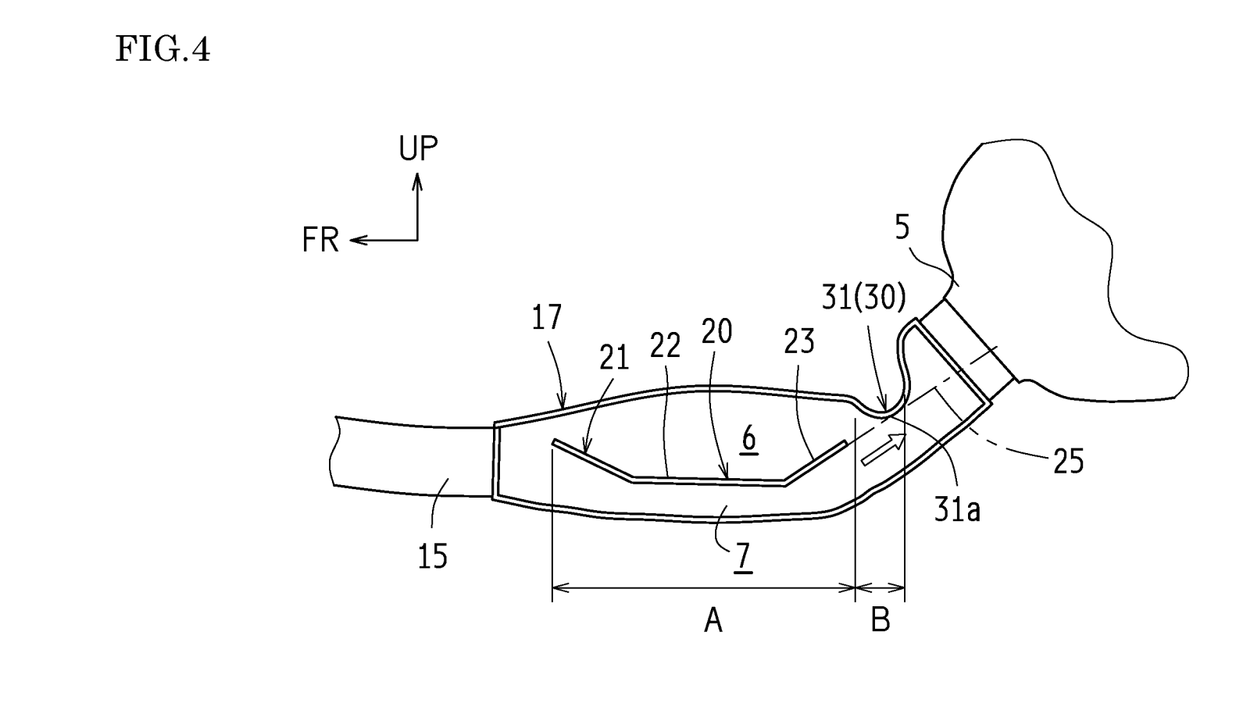
FIG. 4 is a schematic diagram indicating a relationship between a partition plate and a fragile part.
Figure 5A:
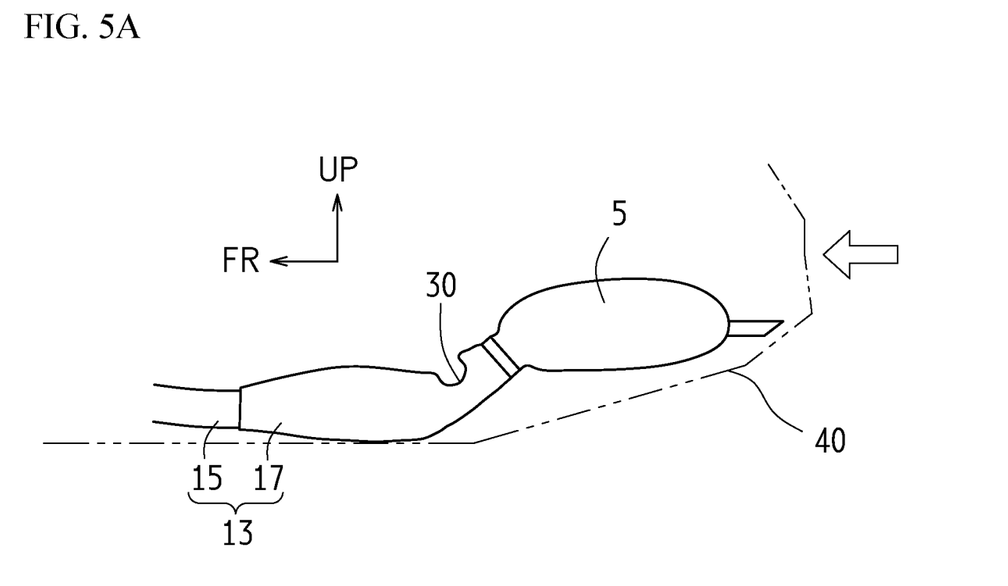
FIG. 5A is a diagram showing a state of the exhaust pipe before a deformation at the time of a rear collision.
Figure 5B:
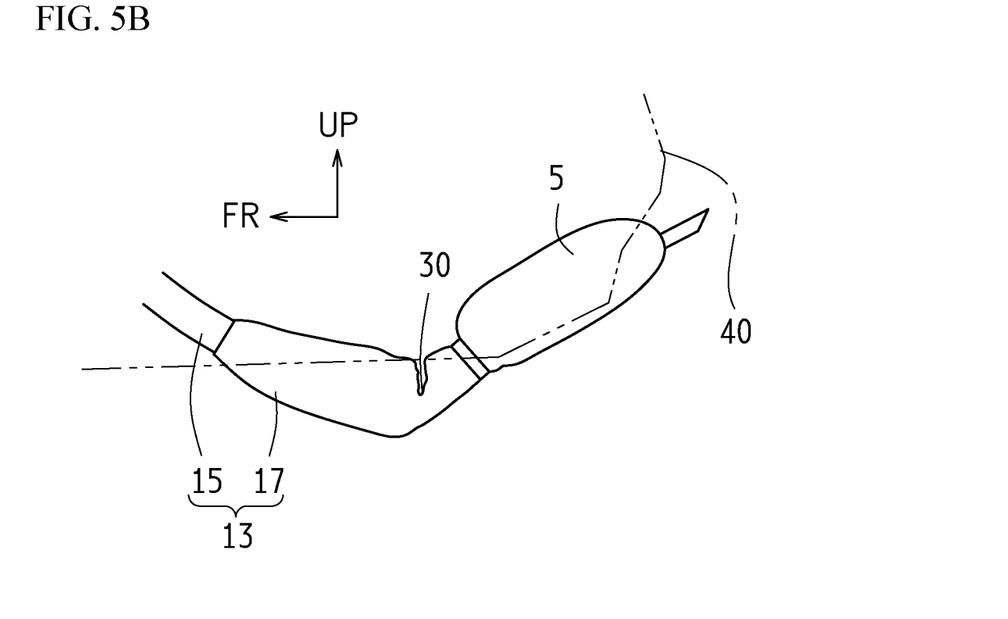
FIG. 5B is a diagram showing a state of the exhaust pipe after the deformation.

FIG. 4 is a schematic diagram indicating a relationship between the partition plate 20 and the fragile part 30. FIGS. 5A and 5B are schematic diagrams indicating the deformation of the tail pipe 13 at the time of a rear collision. FIG. 5A is a diagram showing a state before the deformation. FIG. 5B is a diagram showing a state after the deformation. The reference numeral 40 in FIGS. 5A and 5B shows the outline of a vehicle body.

In the exhaust system 1 of the internal combustion engine according to this embodiment, the recess part 31 is disposed between the partition plate 20 and the main muffler 5, as shown in FIG. 4. In the second pipe 17, a region A in which the partition plate 20 is disposed and a region B in which the recess part 31 is disposed have a positional relationship in which the region A and the region B are not overlapped with each other in the axial direction of the second pipe 17.

In this way, the partition plate 20 that functions to increase the section modulus of the second pipe 17 and the fragile part 30 (the recess part 31) that serves as the starting point of the bending deformation of the second pipe 17 are disposed so as to not overlap with each other in the axial direction of the second pipe 17. Thus, it is possible to prevent the partition plate 20 from blocking the bending deformation of the second pipe 17. Furthermore, the partition plate 20 that functions to increase the section modulus of the second pipe 17 is disposed in the vicinity of the fragile part 30, which causes the stress concentration to the fragile part 30. Accordingly, the tail pipe 13 including the second pipe 17 can be reliably bent and deformed at the time of a vehicle rear collision. Thus, at the time of the rear collision when a load is applied to the vehicle rear part from the back as indicated by the outlined arrow in FIG. 5A, it is possible to reliably bend and deform the second pipe 17 with the fragile part 30 as the starting point, as shown in FIG. 5B, so that the tail pipe 13 including the second pipe 17 is displaced downward. Therefore, the tail pipe 13 does not prevent the deformation of the vehicle rear part, which serves to not only ensure shock absorbing stroke, but also to evacuate the main muffler 5 in the lower region of the vehicle.

In the exhaust system 1 of the internal combustion engine according to this embodiment, the recess part 31 and the downstream side part 23 are formed so that the lower end 31a of the recess part 31 is substantially flush with the virtual extension surface 25 of the downstream side part 23 (more precisely, the virtual extension surface 25 of the rear surface of the downstream side part 23) of the partition plate 20. Thus, it is possible to prevent the draining water and the exhaust gas that flow along the rear surface of the downstream side part 23 from making contact with the recess part 31 (more precisely, the part of the recess part 31 other than the lower end 31a). In this way, the draining water and the exhaust gas can smoothly flow, which prevents degradation of the drainage function and also reduces increase in the back pressure.

In addition to the above, the draining water and the exhaust gas that have flown to the recess part 31 along the rear surface of the downstream side part 23 can further flow along the lower end 31a of the recess part 31 that is set to be substantially flush with the virtual extension surface 25 of the downstream side part 23 as indicated by the outlined arrow in FIG. 4. In other words, the lower end 31a of the recess part 31 can be used as a guide part, thereby further improving the drainage performance and the exhaust performance.

Providing the recess part 31 and the downstream side part 23 in the second pipe 17 requires high accuracy, in the case where the lower end 31a of the recess part 31 should be substantially flush with the virtual extension surface 25 of the downstream side part 23. However, in this embodiment, the second pipe 17 is formed by the half pipe 17a and the half pipe 17b, which respectively have shapes made by dividing a pipe into upper and lower two parts in the vertical direction. Thus, for example, after attaching the partition plate 20, by welding or the like, to the upper half pipe 17a having the recess part 31, the upper half pipe 17a and the lower half pipe 17b are vertically bonded to each other. In this way, it is possible to manufacture the second pipe 17 having the partition plate 20 and the fragile part 30 easily and accurately.

Other Embodiments

The present disclosure is not limited to the above embodiment and may be embodied in various other forms without departing from the gist or essential characteristics thereof.

Figure 6:
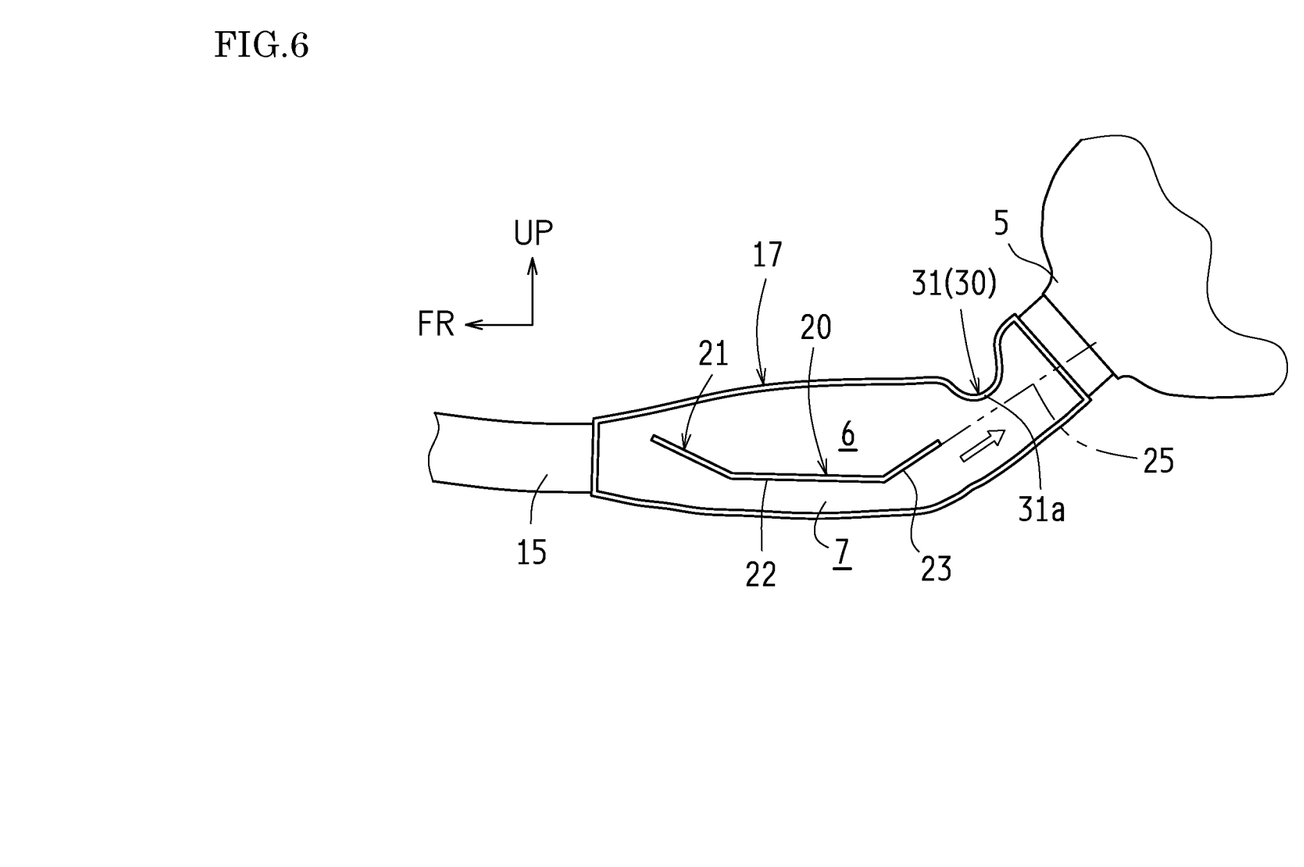
FIG. 6 is a schematic diagram indicating a relationship between the partition plate and the fragile part according to another embodiment.

In the above embodiment, the recess part 31 and the downstream side part 23 are formed so that the lower end 31a of the recess part 31 is substantially flush with the virtual extension surface 25 of the downstream side part 23. However, the present disclosure is not limited thereto, provided that the lower end 31a of the recess part 31 does not protrude downward beyond the virtual extension surface 25 of the downstream side part 23. As shown in FIG. 6, the recess part 31 and the downstream side part 23 may be formed so that the lower end 31a of the recess part 31 is above the virtual extension surface 25. In this case also, it is possible to ensure the smooth flow of the draining water and the exhaust gas by preventing the draining water and the exhaust gas, which flow along the rear surface of the downstream side part 23, from making contact with the recess part 31, although a flow guide effect by the lower end 31a of the recess part 31 cannot be expected.

Also, in the above embodiment, the fragile part 30 is constituted by the recess part 31. However, the present disclosure is not limited thereto, provided that the fragile part 30 serves as the starting point of the bending deformation of the tail pipe 13 (the second pipe 17) at the time of a rear collision. For example, the fragile part 30 may be constituted by a bending part or a bellows part.

Furthermore, in the above embodiment, the downstream side part 23 of the partition plate 20 inclines linearly. However, the present disclosure is not limited thereto, provided that the downstream side part 23 of the partition plate 20 gradually inclines upward toward the downstream and that the lower end 31a of the recess part 31 does not protrude downward beyond the virtual extension surface 25 of the downstream side part 23. For example, the downstream side part 23 of the partition plate 20 may be curved so as to have an arc shape that protrudes downward.

As described above, the above embodiment is to be considered in all respects as illustrative and not limiting. Furthermore, all modifications and changes that come within the meaning and range of equivalency of the claims are intended to be embraced therein.

INDUSTRIAL APPLICABILITY

With the present disclosure, an exhaust pipe can be reliably bent and deformed at the time of a vehicle rear collision while drainage performance in the exhaust pipe is improved in normal times. Thus, the present disclosure can be suitably applied to an exhaust system of an internal combustion engine.

The invention claimed is:

1. An exhaust system of an internal combustion engine, comprising an exhaust pipe through which exhaust gas flows from the internal combustion engine, the exhaust pipe including, in a downstream end part thereof: a fragile part that serves as a starting point of bending deformation of the exhaust pipe; and a partition plate that divides an inside of the exhaust pipe into an upper portion and a lower portion so as to form, under the partition plate, a passage to flow water that accumulates in the exhaust pipe, wherein the partition plate is disposed in a vicinity of the fragile part and furthermore at a position not overlapping with the fragile part in an axial direction of the exhaust pipe; and wherein the fragile part is constituted by a recess part that is disposed downstream of the partition plate and that is formed by making a dent in an upper face of the exhaust pipe.

2. The exhaust system of an internal combustion engine according to claim 1, wherein the partition plate includes: an upstream side part that gradually inclines downward toward the downstream; and a downstream side part that gradually inclines upward toward the downstream, so that a cross-sectional area of the passage in a center part is smaller than the cross-sectional area in an upstream side and the cross-sectional area in the downstream side, and wherein the recess part and the downstream side part are formed so that a lower end of the recess part does not protrude downward beyond a virtual extension surface of the downstream side part.

3. The exhaust system of an internal combustion engine according to claim 2, wherein the recess part and the downstream side part are formed so that the lower end of the recess part is substantially flush with the virtual extension surface of the downstream side part.

4. The exhaust system of an internal combustion engine according to claim 1, wherein the fragile part and the partition plate are disposed in the exhaust pipe, at a portion that is constituted by half pipes made by dividing a pipe into an upper part and a lower part in a vertical direction.

5. The exhaust system of an internal combustion engine according to claim 2, wherein the fragile part and the partition plate are disposed in the exhaust pipe, at a portion that is constituted by half pipes made by dividing a pipe into an upper part and a lower part in a vertical direction.

6. The exhaust system of an internal combustion engine according to claim 3, wherein the fragile part and the partition plate are disposed in the exhaust pipe, at a portion that is constituted by half pipes made by dividing a pipe into an upper part and a lower part in a vertical direction.

* * * * *

UNITED STATES PATENT AND TRADEMARK OFFICE
CERTIFICATE OF CORRECTION

PATENT NO. : 10,724,421 B2
APPLICATION NO. : 16/154410
DATED : July 28, 2020
INVENTOR(S) : Keiji Utsunomiya, Nakaya Takagaki and Masaya Takeuchi Page 1 of 1

It is certified that error appears in the above-identified patent and that said Letters Patent is hereby corrected as shown below:

On the Title Page

Column 1, item (72), inventor 1, delete "Toyota (JP)" and insert --Toyota-shi, Aichi-ken (JP)--, therefor.

Column 1, item (72), inventor 2, delete "Toyota (JP)" and insert --Toyota-shi, Aichi-ken (JP)--, therefor.

Column 1, item (72), inventor 3, delete "Okazaki (JP)" and insert --Okazaki-shi, Aichi-ken (JP)--, therefor.

Column 1, item (73), assignee 2, delete "Okazaki (JP)" and insert --Okazaki-shi, Aichi-ken (JP)--, therefor.

In the Specification

In Column 1, Line(s) 29, delete "heading" and insert --bending--, therefor.

In Column 2, Line(s) 4, delete "or an" and insert --of an--, therefor.

In Column 5, Line(s) 36, before "inclines", delete "in".

In Column 5, Line(s) 53, delete "info" and insert --into--, therefor.

Signed and Sealed this
Seventeenth Day of November, 2020

Andrei Iancu
*Director of the United States Patent and Trademark Office*